United States Patent
Yokota et al.

(10) Patent No.: US 8,390,272 B2
(45) Date of Patent: Mar. 5, 2013

(54) POSITION DETECTING DEVICE

(75) Inventors: Masaru Yokota, Saitama (JP); Hiroshi Munakata, Saitama (JP)

(73) Assignee: Wacom Co., Ltd., Saitama (JP)

( * ) Notice: Subject to any disclaimer, the term of this patent is extended or adjusted under 35 U.S.C. 154(b) by 280 days.

(21) Appl. No.: 12/841,893

(22) Filed: Jul. 22, 2010

(65) Prior Publication Data

US 2011/0068776 A1    Mar. 24, 2011

(30) Foreign Application Priority Data

Sep. 21, 2009   (JP) .................................. 2009-218229

(51) Int. Cl.
*G01B 7/14*    (2006.01)

(52) U.S. Cl. ....... 324/207.11; 178/18; 341/15; 345/173; 349/12

(58) Field of Classification Search ............. 324/207.11; 178/18; 341/15; 345/173; 349/12
See application file for complete search history.

(56) References Cited

U.S. PATENT DOCUMENTS

| | | | |
|---|---|---|---|
| 4,878,553 A * | 11/1989 | Yamanami et al. ........ | 178/18.07 |
| 5,752,513 A * | 5/1998 | Acker et al. ................. | 600/424 |
| 6,516,212 B1 * | 2/2003 | Bladen et al. ................ | 600/424 |
| 2004/0105040 A1 | 6/2004 | Oh et al. | |
| 2004/0187593 A1 * | 9/2004 | Okada ............................ | 73/780 |
| 2006/0066581 A1 | 3/2006 | Lyon et al. | |
| 2006/0197750 A1 | 9/2006 | Kerr et al. | |
| 2006/0274055 A1 * | 12/2006 | Reynolds et al. ............. | 345/174 |
| 2011/0005338 A1 * | 1/2011 | Okada ...................... | 73/862.043 |

FOREIGN PATENT DOCUMENTS

| | | |
|---|---|---|
| EP | 2 077 489 A1 | 7/2009 |
| JP | 2009162538 A | 7/2009 |
| WO | 2006/130749 A1 | 12/2006 |
| WO | WO 2007129085 A2 * | 11/2007 |

OTHER PUBLICATIONS

U.S. Appl. No. 61/153,059, filed Feb. 2009, Friedrich et al.*
Partial European Search Report, for corresponding European Application No. 10175429.9, dated Jan. 19, 2011, 3 pages.
Communication pursuant to Article 94(3) EPC issued in corresponding EP Application No. 10175429.9, dated Apr. 23, 2012, 2 pages.

\* cited by examiner

*Primary Examiner* — Huy Q Phan
*Assistant Examiner* — Temilade S Rhodes-Vivour
(74) *Attorney, Agent, or Firm* — Seed IP Law Group PLLC

(57) ABSTRACT

A position detecting device is disclosed, which detects a position indicated by a human body. The position detecting device includes: a sensor substrate including a detection area, in which a plurality of detection electrodes are formed, and a wiring area, in which wiring led out from the detection electrodes is formed, and a case configured to house the sensor substrate. The sensor substrate further includes a conductor, which is connected to a fixed potential, provided at a position opposed to (facing) the wiring area.

5 Claims, 7 Drawing Sheets

F I G . 7
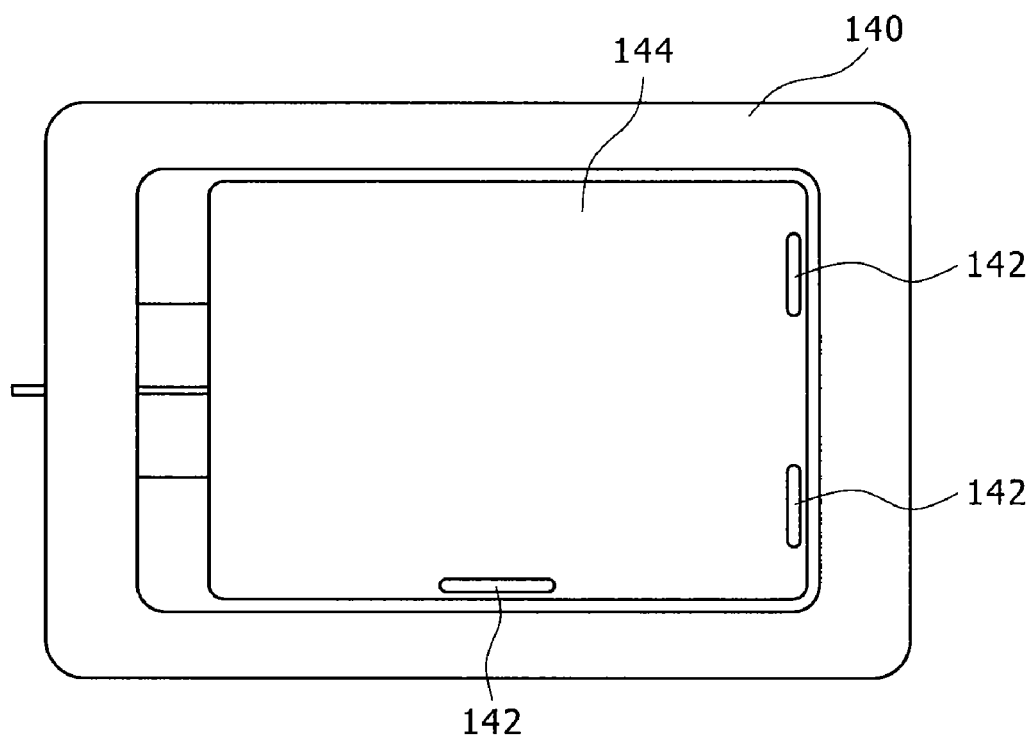

POSITION DETECTING DEVICE

CROSS-REFERENCE TO RELATED APPLICATION

The present application claims the benefit under 35 U.S.C. §119(a) of Japanese Patent Application No. 2009-218229, filed, Sep. 21, 2009, the entire content of which is incorporated by reference herein.

BACKGROUND OF THE INVENTION

1. Field of the Invention

The present invention relates to a position detecting device configured to perform position detection based on a capacitance system.

2. Description of the Related Art

There has been known a position detecting device formed by fitting an input unit into an opening part of a case. This input unit is configured by superposing a first detector of a capacitance system on a second detector of an electromagnetic induction system (refer to, e.g., Japanese Patent Laid-open No. 2009-162538, hereinafter referred to as patent document 1, pages 4 to 8, FIGS. 1 to 11). In this position detecting device, the position indicated by a part of the human body (e.g., a finger) is detected by the first detector. Furthermore, by the second detector, the position indicated by a pen-type position indicator, including a built-in resonant circuit composed of a coil and a capacitor, is detected.

The position detecting device disclosed in patent document 1 has a structure in which the detectors are fitted into the opening part of the case. This results in that the first detector, closer to the surface, is exposed through the entire opening part. The first detector includes a detection area for detecting the position indicated by the human body. If wiring (wires) led out from this detection area is arranged in an area adjacent to the detection area, even the capacitance of the wiring changes also when the human body gets close to the wiring, which leads to lowering accuracy in position detection by the capacitance system.

SUMMARY OF THE INVENTION

There is a need to provide a position detecting device that is free from lowering of the position detection accuracy that may be caused when wiring is arranged adjacent to the detection area.

According to an aspect of the present invention, there is provided a position detecting device that detects a position indicated by a human body part. The position detecting device includes a sensor substrate having a detection area, in which a plurality of detection electrodes are formed, and a wiring area, in which wiring led out from the detection electrodes is formed. The position detecting device further includes a case configured to house the sensor substrate. The sensor substrate further includes a conductor, connected to a fixed potential, which is provided at a position opposed to (i.e., facing) the wiring area. Because the conductor connected to the fixed potential is disposed at the position opposed to the wiring area adjacent to the detection area, in which the detection electrodes are formed, the capacitance of the wiring included in the wiring area does not change even when a human body part is brought close to the wiring. Thus, lowering of the position detection accuracy can be prevented. In particular, by employing the ground potential as the above-described fixed potential, change in the capacitance of the wiring due to the approach of a human body part can be surely prevented.

By forming the above-described sensor substrate by using a flexible substrate, the position detecting device having a small thickness can be easily realized by disposing the sensor substrate on the surface of the case. In addition, the above-described adverse effect (change in the capacitance of the wiring) attributed to the placement of the sensor substrate on the surface of the case can be prevented.

The position detecting device may further include a magnetic flux detection substrate disposed at a position opposed to (i.e., facing) the above-described sensor substrate, on the side opposite from the side in which a human body part indicates a position. The magnetic flux detection substrate has at least one loop coil for detecting magnetic flux generated by a coil provided in a position indicator. The entire surface of the sensor substrate housed in the case can be used as the effective area of the position indicator.

It is desirable that the above-described conductor has a shape that reduces the occurrence of an eddy current on the surface, preferably a shape having a slit extending from an outer edge of the conductor toward the inside of the conductor. This feature can prevent the occurrence of the eddy current on the surface of the conductor due to a magnetic field generated by the magnetic flux detection substrate or the position indicator, and thus can prevent lowering of the accuracy of position detection based on an electromagnetic induction system.

BRIEF DESCRIPTION OF THE DRAWINGS

FIG. 7 is a plan view of a case for showing the details of through-holes; and

DETAILED DESCRIPTION OF THE PREFERRED EMBODIMENT

A position detecting device according to one embodiment of the present invention will be described below with reference to the drawings.

Figure 1:
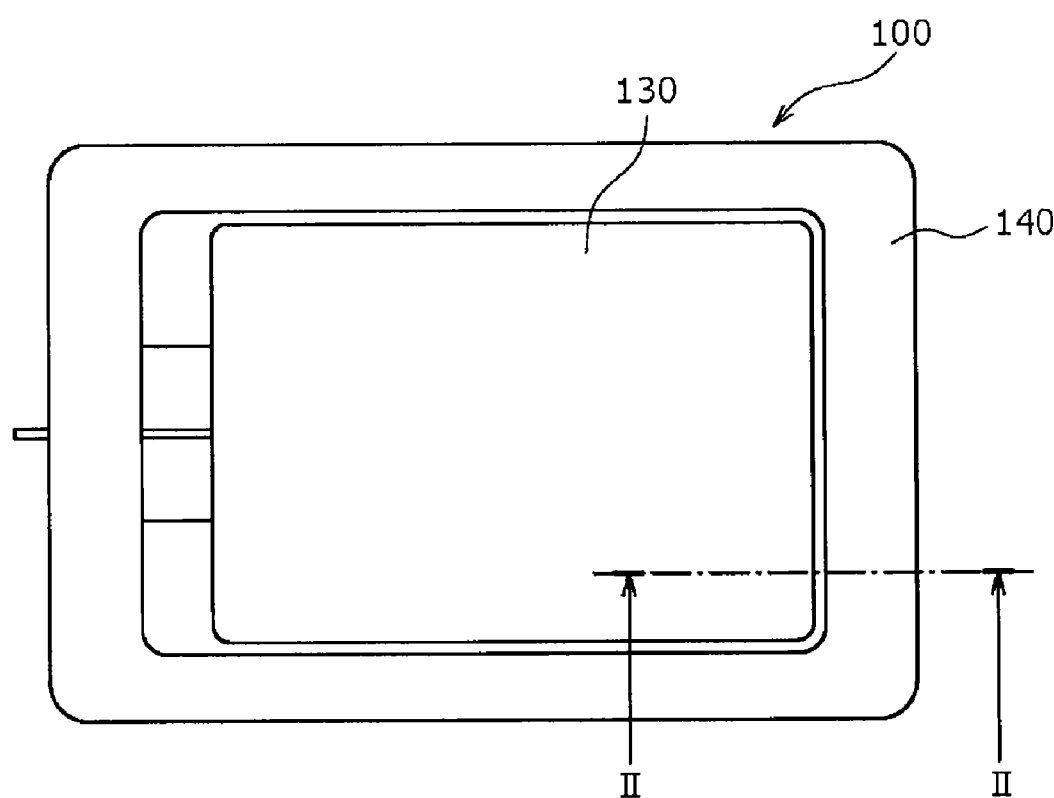
FIG. 1 is a plan view of a position detecting device according to one embodiment of the present invention.
Figure 2:
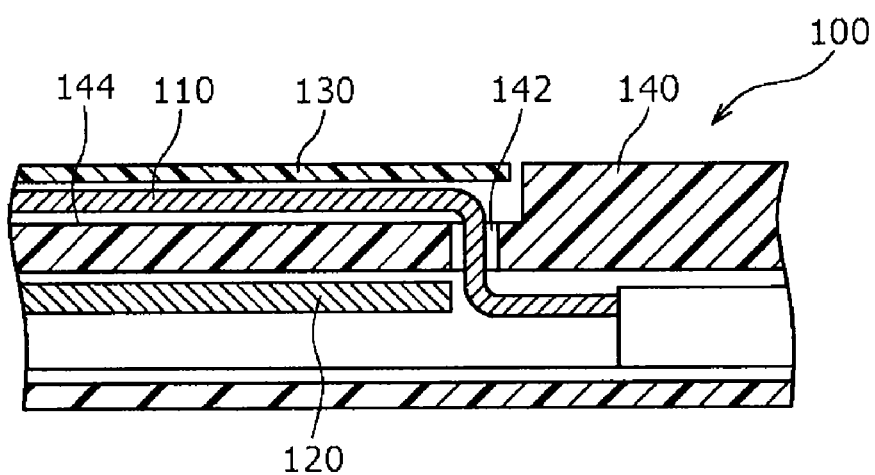
FIG. 2 is an enlarged sectional view taken along line II-II in FIG. 1.
Figure 3:
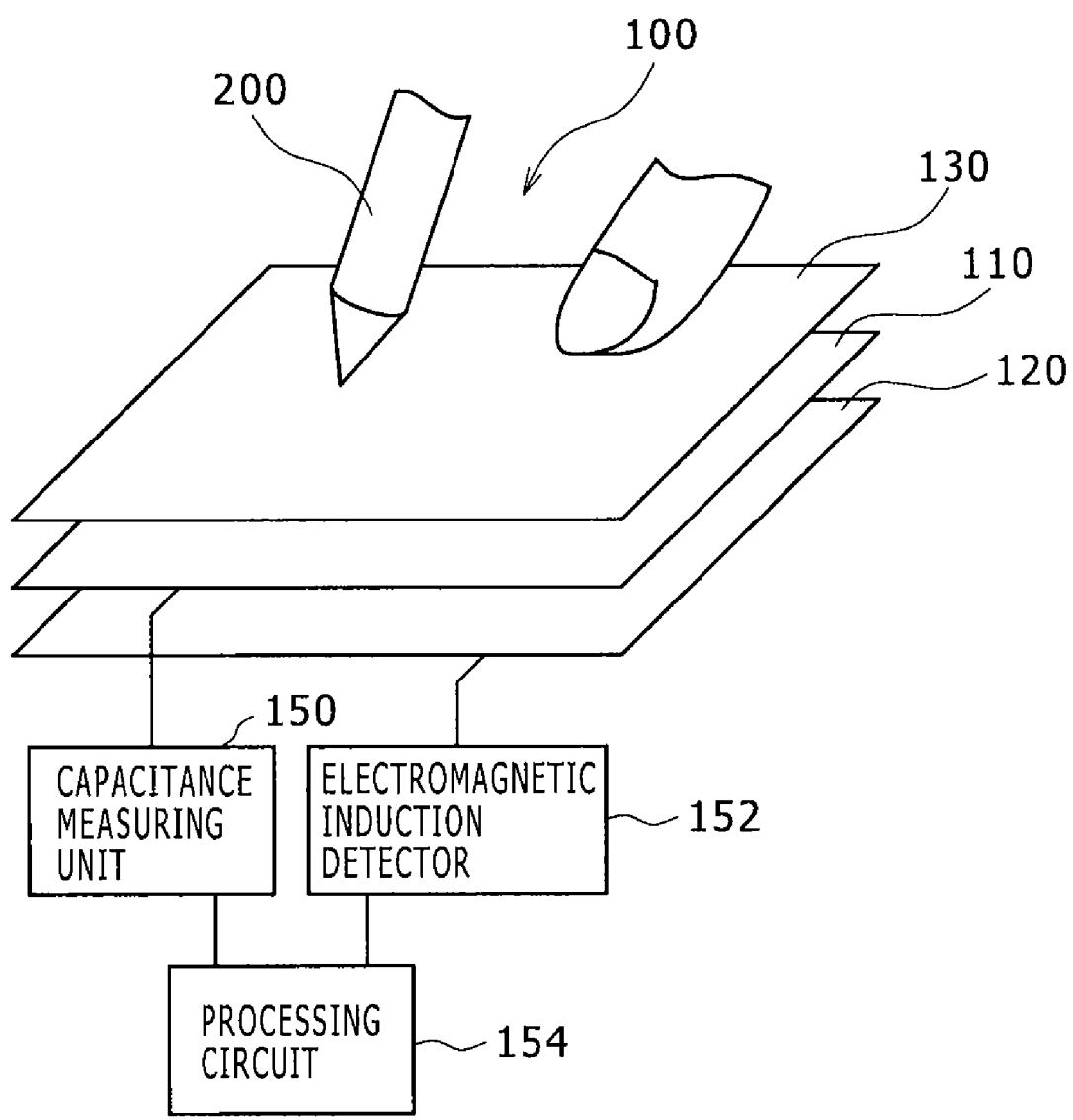
FIG. 3 is a diagram for explaining the operation of the position detecting device.

FIG. 1 is a plan view of the position detecting device according to one embodiment. FIG. 2 is an enlarged sectional view taken along line II-II of FIG. 1. The position detecting device 100 of the present embodiment is configured to detect a position indicated by part of the human body (e.g. a fingertip) or a position indicator 200 (FIG. 3). The position detecting device 100 includes a sensor substrate 110 serving as a first detector for performing position detection based on a capacitance system, and a magnetic flux detection substrate 120 serving as a second detector for performing position detection based on an electromagnetic induction system. The position detecting device 100 further includes a sheet member 130 covering the surface of the sensor substrate 110, a case 140 having a housing part 144 for housing the sensor substrate 110, the magnetic flux detection substrate 120, and the sheet member 130, and various types of circuits (FIG. 3)

necessary for position detection. The position detecting device 100 is connected to an external apparatus (not shown), such as a personal computer or a personal digital assistant (PDA), and is used as an input device for the external apparatus. When a position on the surface of the sheet member 130 is indicated (pointed to) by a fingertip or the position indicator 200, the coordinate data of this indicated position is output from the position detecting device 100 to the external apparatus. In the example shown in FIG. 2, gaps are provided among the sheet member 130, the sensor substrate 110, and the housing part 144 for easy understanding. However, in practice, these components are bonded to each other by an adhesive, so as to ensure that they are in tight contact with each other evenly.

FIG. 3 is a diagram for explaining the operation of the position detecting device 100. As shown in FIG. 3, the position detecting device 100 includes a capacitance measuring unit 150, an electromagnetic induction detector 152, and a processing circuit 154 as the various types of circuits for position detection.

The capacitance measuring unit 150 is a circuit configured to measure a change in the capacitance of detection electrodes provided in the sensor substrate 110, and is connected to the sensor substrate 110 and the processing circuit 154. The electromagnetic induction detector 152 is a circuit configured to detect the position of the point indicated by a position indicator 200 based on an electromagnetic induction system, and is connected to the magnetic flux detection substrate 120 and the processing circuit 154. The processing circuit 154 is a circuit configured to calculate the coordinate data of the point indicated by a fingertip or the position indicator 200, which is detected by the sensor substrate 110 or the magnetic flux detection substrate 120. The coordinate data calculated by the processing circuit 154 is sent to the external apparatus.

Figure 4:
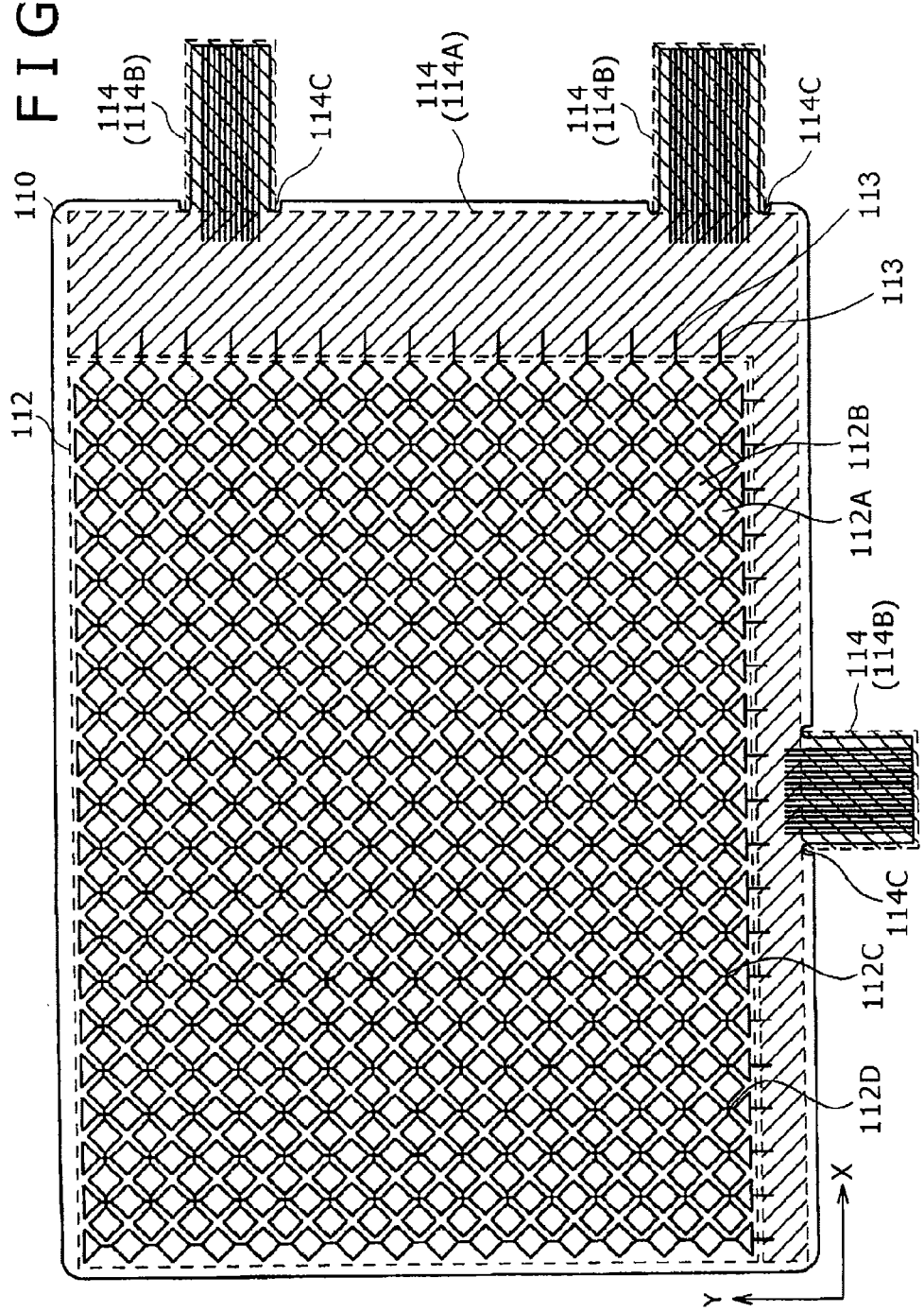
FIG. 4 is a plan view showing a sensor substrate.
Figure 5:
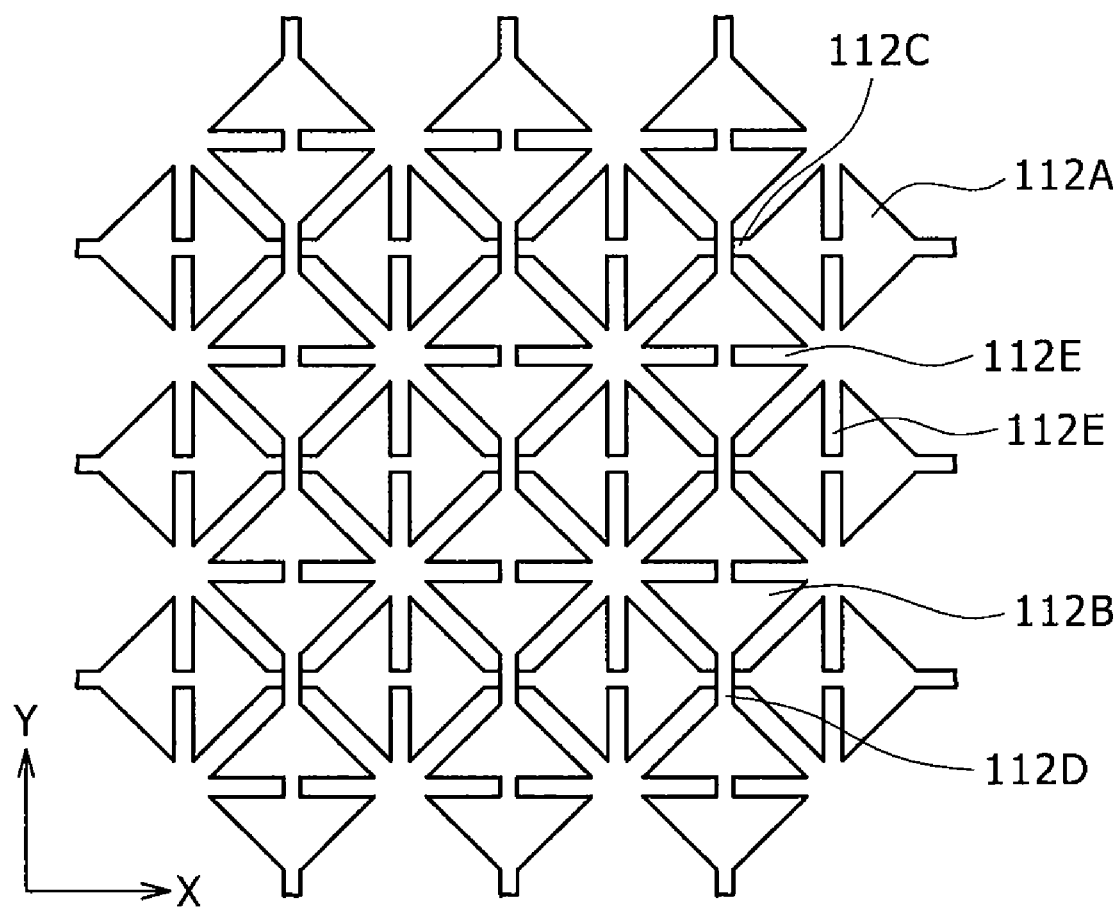
FIG. 5 is a partial plan view showing part of the sensor substrate in an enlarged manner.

The details of the sensor substrate 110 will be described below. FIG. 4 is a plan view showing the whole of the sensor substrate 110. FIG. 5 is a partial plan view showing part of the sensor substrate 110 in an enlarged manner.

The sensor substrate 110 is a film substrate having flexibility, i.e. a flexible substrate. In the present embodiment, a polyethylene terephthalate (PET) substrate is used. A film substrate other than the PET substrate, such as a polyimide substrate, may be used. The sensor substrate 110 includes a detection area 112, in which plural detection electrodes 112A and 112B are formed, a wiring area 114, in which wiring 113 led out from the detection electrodes 112A and 112B is provided, and a conductor 116 (to be described later in FIG. 6) disposed at the position opposed to (facing) the wiring area 114.

The detection electrodes 112A each have a nearly-square shape, and are regularly arranged on the entire surface of the detection area 112 in such a way that one diagonal of each detection electrode 112A is along the X direction (the direction along the longer sides of the detection area 112 having a rectangular shape is defined as the X direction, and the direction along the shorter sides thereof is defined as the Y direction). Furthermore, the detection electrodes 112A adjacent to each other along the X direction are electrically connected to each other via an auxiliary line 112C. Plural detection electrode groups, each composed of such plural detection electrodes 112A connected to each other in one row along the X direction, are juxtaposed to each other along the Y direction.

Similarly, the detection electrodes 112B each have a nearly-square shape as with the detection electrode 112A, and are regularly arranged on the entire surface of the detection area 112 in such a way that one diagonal of each detection electrode 112B is along the Y direction. Furthermore, the detection electrodes 112B adjacent to each other along the Y direction are electrically connected to each other via an auxiliary line 112D. Plural detection electrode groups, each composed of such plural detection electrodes 112B connected to each other in one row along the Y direction, are juxtaposed to each other along the X direction.

The detection electrodes 112A and the detection electrodes 112B are regularly arranged in the detection area 112 in such a way that the gaps among the detection electrodes 112A are filled by the detection electrodes 112B and vice versa. When a fingertip of the user is brought into contact with the surface of the sheet member 130, the contact surface of the fingertip is opposed to both of the detection electrode 112A and the detection electrode 112B simultaneously. Although the auxiliary lines 112C and 112D intersect with each other, they are electrically insulated from each other. For example, by using the sensor substrate 110 having two, three or more metal layers, the electrical insulation between the auxiliary lines 112C and 112D is achieved. In addition, in the detection electrodes 112A and 112B, slits 112E (see FIG. 5) are formed at positions along the other diagonal of each of the detection electrodes 112A and 112B in order to reduce eddy currents arising due to magnetic flux generated by the magnetic flux detection substrate 120 or the position indicator 200. The shape of the slits 112E shown in FIG. 5 is one example, and the shape and the number of slits 112E can be changed according to each application.

The capacitance measuring unit 150 detects change in the capacitance of the X-direction detection electrode group composed of the plural detection electrodes 112A, on a group-by-group basis, and detects change in the capacitance of the Y-direction detection electrode group composed of the plural detection electrodes 112B, also on a group-by-group basis. The processing circuit 154 specifies the X-direction and Y-direction detection electrode groups whose capacitance is increased due to the approach of a fingertip, and calculates the position indicated by the fingertip.

The above-described wiring area 114 includes an adjacent wiring area 114A, which is adjacent to the periphery of the detection area 112 and includes the wiring 113 connected to the detection electrodes 112A and 112B, and a lead wiring area 114B used for connecting the wiring 113 included in this adjacent wiring area 114A to the processing circuit 154 (or the capacitance measuring unit 150). In FIG. 4, the wiring area 114 is shown with hatched lines, and the direction of the hatched lines is different between the adjacent wiring area 114A and the lead wiring area 114B.

Figure 6:
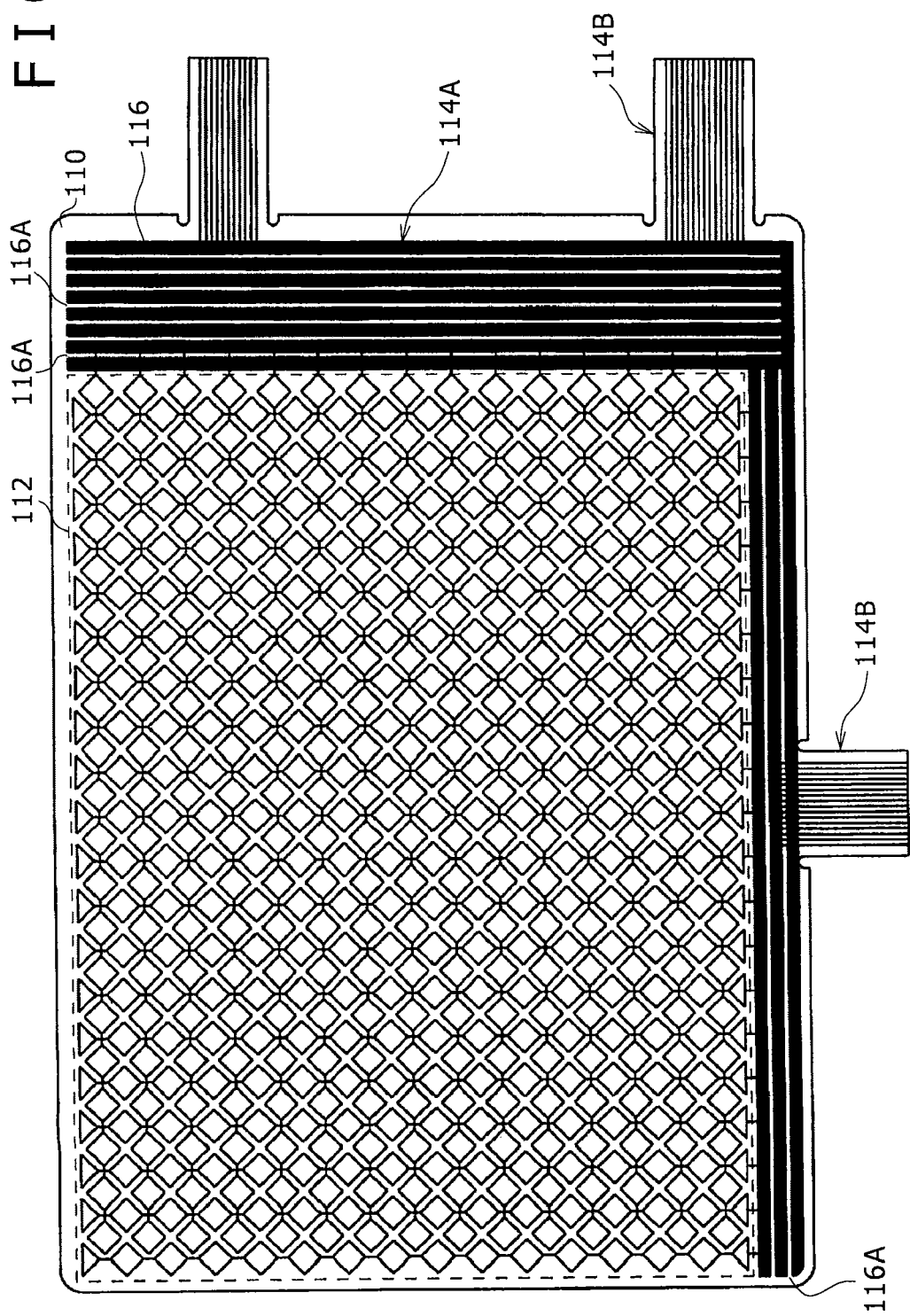
FIG. 6 is a diagram showing a conductor provided at the position corresponding to an adjacent wiring area.

In the present embodiment, on the sensor substrate 110, the conductor 116 connected to a fixed potential is provided on the surface side (on the side of the sheet member 130) and at the position opposed to (or facing) the adjacent wiring area 114A. FIG. 6 is a diagram showing the conductor 116 provided at the position corresponding to the adjacent wiring area 114A. As shown in FIG. 6, the conductor 116 covers the whole of the adjacent wiring area 114A.

Detection by the above-described capacitance measuring unit 150 is so performed that the detection area 112 is the object of detection. However, even when the adjacent wiring area 114A is indicated (pointed to) by a fingertip of the user, the capacitance of the wiring 113 included in the adjacent wiring area 114A also changes. This possibly causes erroneous detection by the capacitance measuring unit 150. The conductor 116 is a component provided in order to prevent this erroneous detection. By covering the wiring 113 in the adjacent wiring area 114A with the conductor 116 connected to a fixed potential, the capacitance of the wiring 113 is prevented from changing even when a fingertip of the user gets close to the adjacent wiring area 114A. It is most preferable that the fixed potential connected to the conductor 116 be the ground potential. However, another potential may be employed in principle. Connection to the fixed potential is achieved via a line included in the lead wiring area 114B, for example.

The conductor 116 has such a shape as to reduce the occurrence of eddy currents on the surface (the surface of the conductor 116 itself). Specifically, in the conductor 116, plural slits 116A extending from the outer edge of the conductor 116 toward the inside thereof are formed in order to reduce eddy currents arising due to magnetic flux generated by the magnetic flux detection substrate 120 or the position indicator 200. Any form other than the slits 116A shown in FIG. 6 may be employed as long as the form allows reduction of the occurrence of eddy currents. For example, many through-holes may be formed in the conductor 116, or many trenches (recesses and projections) may be formed on the surface of the conductor 116.

The area as the combination of the detection area 112 and the adjacent wiring area 114A has a rectangular shape. The lead wiring area 114B outwardly extends from one or plural places (in the example shown in FIG. 4, three places) on the periphery of this rectangular shape. Furthermore, cut parts 114C having a concave shape are provided on the outer periphery of the adjacent wiring area 114A and adjacent to a respective one of the lead wiring areas 114B at two places.

The connection between the sensor substrate 110 and the capacitance measuring unit 150 is achieved by using the lead wiring area 114B. Specifically, part of the wiring area 114 (the root part of the lead wiring area 114B) is bent, and the lead wiring area 114B is deformed (bent) and routed in the case 140. Thereby, the electrical connection between the sensor substrate 110 and the capacitance measuring unit 150 is achieved.

For this purpose, in the case 140, through-holes 142 are formed at three places corresponding to the positions through which the lead wiring areas 114B are routed. FIG. 7 is a plan view of the case 140 showing the details of the through-holes. The case 140 has the housing part 144 formed of a recess having a rectangular shape at the position corresponding to the sensor substrate 110 and the sheet member 130. As shown in FIG. 2, the depth of the housing part 144 is so designed that the surface position of the sheet member 130 is almost at the same level as that of the surface of the case 140 in the periphery of the housing part 144 when the sensor substrate 110 and the sheet member 130 are housed in the housing part 144. The through-holes 142 at three places are formed through the bottom of the housing part 144 and near the periphery of the housing part 144 (near the sidewall thereof). Each through-hole 142 is formed inside the sidewall of the housing part 144. Forming the through-hole 142 at such a position makes it possible to shield the entire through-hole 142 with the sheet member 130.

The lead wiring area 114B is bent from its root part and the bent part is made to pass through the through-hole 142 (see FIG. 2), so that the end of the lead wiring area 114B is connected to the capacitance measuring unit 150.

Figure 8:
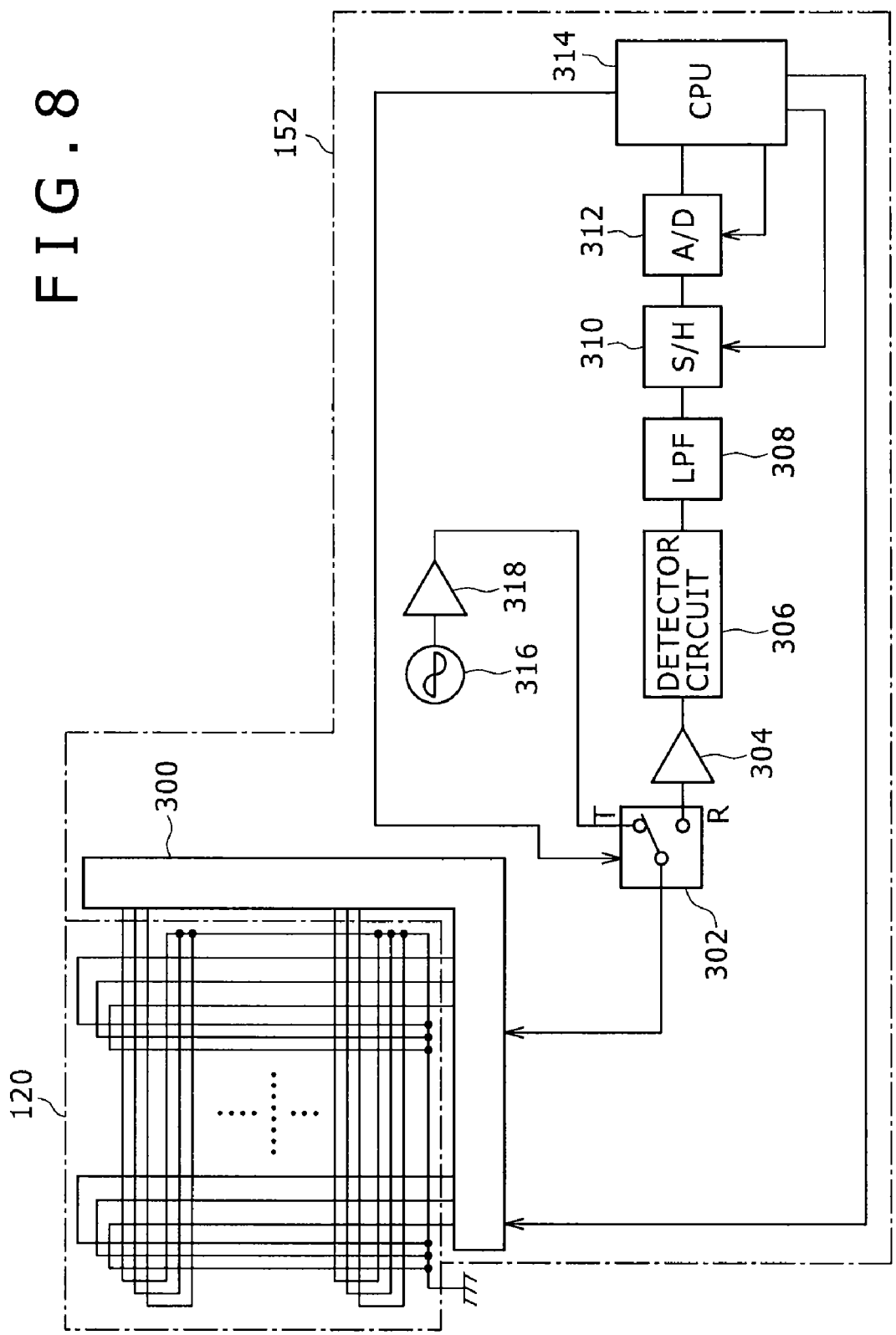
FIG. 8 is a block diagram for explaining position detection operation by use of a magnetic flux detection substrate.

Position detection based on the magnetic flux detection substrate 120 will be described below. FIG. 8 is a block diagram for explaining position detection operation based on the magnetic flux detection substrate 120. The magnetic flux detection substrate 120 is provided at a position opposed to (facing) the sensor substrate 110, either on the front surface or back surface of the case 140. In the example of FIG. 2, the magnetic flux detection substrate 120 is disposed on the back surface side of the case 140. However, it may be disposed on the front surface side of the case 140 in the area sandwiched between the case 140 and the sensor substrate 110.

The magnetic flux detection substrate 120 includes plural (e.g. 40) loop coils along each of the X direction and the Y direction (these X and Y directions are the same as those of the X and Y directions in the sensor substrate 110 shown in FIG. 4).

The electromagnetic induction detector 152 includes a selection circuit 300, a transmission/reception switch circuit 302, an amplifier 304, a detector circuit 306, a low-pass filter (LPF) 308, a sample hold circuit (S/H) 310, an analog-digital converter (A/D) 312, a CPU 314, an oscillator 316, and a driver 318. The selection circuit 300 selects one loop coil among the plural loop coils included in the magnetic flux detection substrate 120 and connects it to the transmission/reception switch circuit 302. In the state in which the transmission/reception switch circuit 302 is switched to the transmission side (T), the loop coil selected by the selection circuit 300 is connected to the driver 318. In this state, when an AC signal of a predetermined frequency is output from the oscillator 316, the driver 318 makes a current flow to the connected loop coil, so that a magnetic field is generated by this loop coil.

The position indicator 200 includes a built-in resonant circuit formed by connecting a coil and a capacitor in parallel. If the position indicator 200 is brought close to the surface of the position detecting device 100 in the state in which magnetic flux is generated by the loop coil, voltage induced in the coil in the position indicator 200 is applied to the capacitor and a charge is accumulated therein. Thereafter, when the transmission/reception switch circuit 302 is switched to the reception side (R), the generation of the magnetic field by the loop coil is stopped. Then, the charge accumulated in the capacitor until then is discharged from the position indicator 200 and a current flows through the coil, so that a magnetic field is generated by this coil. In this state, the intensity of the signal output from each loop coil is detected while switching the selected loop coil by the selection circuit 300. Thereby, the position of the position indicator 200 is specified. Specifically, this signal intensity detection is carried out through the following process. For the signal amplified by the amplifier 304, detection processing (e.g. AM wave detection processing) is executed by the detector circuit 306. Furthermore, the signal resulting from the passage through the LPF 308 is converted to digital data by using the sample hold circuit 310 and the analog-digital converter 312. The digital data is processed by the CPU 314.

As described above, the position detecting device 100 of the present embodiment has the conductor 116 connected to a fixed potential at the position opposed to the wiring area 114 on the sensor substrate 110. Therefore, even when the human body is brought close to the wiring 113 included in the wiring area 114, the capacitance of the wiring 113 does not change, and thus lowering of the position detection accuracy can be prevented. In particular, by employing the ground potential as the above-described fixed potential, change in the capacitance due to the approach of a human body part can be surely prevented.

Furthermore, by forming the sensor substrate 110 by using a flexible substrate, the position detecting device 100 having a small thickness can be easily realized by disposing the sensor substrate 110 on the surface of the case. In addition, the above-described adverse effect (change in the capacitance of the wiring 113) attributed to the placement of the sensor substrate 110 on the surface of the case can be prevented. Moreover, in the case of using the sensor substrate 110 and the magnetic flux detection substrate 120 in combination, the entire surface of the sensor substrate 110 housed in the case 140 can be used as the effective area of the position indicator 200.

Furthermore, by forming the conductor 116 into such a shape as to reduce the occurrence of eddy currents on the surface, preferably a shape having the slits 116A extending from the outer edge of the conductor 116 toward the inside thereof, eddy currents can be prevented from arising on the surface of the conductor 116 due to a magnetic field generated by the magnetic flux detection substrate 120 or the position indicator 200. Thus, lowering of the accuracy of position detection by the electromagnetic induction system can be prevented.

It should be noted that the present invention is not limited to the above-described embodiment but various modifications can be made without departing from the scope of the present invention. For example, in the above-described embodiment, the sensor substrate 110 and the magnetic flux detection substrate 120 are used in combination. However, it is also possible to apply the present invention to a position detecting device including only the sensor substrate 110 of a capacitance system.

Furthermore, in the above-described embodiment, the entire sensor substrate 110 is formed by using a film substrate having flexibility (flexible substrate). However, the material of the main body part composed of the detection area 112 and the adjacent wiring area 114A in the sensor substrate 110 may be different from that of the lead wiring area 114B, and only the lead wiring area 114B may be formed by using a material having flexibility. Furthermore, the present invention can be applied also where the entire sensor substrate 110 is formed by using a material having no flexibility.

According to the embodiment of the present invention, the conductor 116 connected to a fixed potential is disposed at the position opposed to the wiring area 114 adjacent to the detection area 112 in which the detection electrodes 112A and 112B are formed. Thus, even when a human body part is brought close to the wiring 113 included in the wiring area 114, the capacitance of the wiring 113 does not change, and thus lowering of the position detection accuracy can be prevented.

What is claimed is:

1. A sensor substrate configured to allow detection of a pointed position based on a capacitance system, the sensor substrate comprising:
a detection area, in which a plurality of detection electrodes are arranged, and a wiring area, in which wiring led out from the detection electrodes is arranged, wherein one or more of the plurality of detection electrodes each includes one or more slits that extend from an outer edge of the detection electrode toward inside of the detection electrode; and
a conductor connected to a fixed potential and is arranged on one side of the sensor substrate, the conductor being configured and arranged to oppose the wiring area arranged on another side of the sensor substrate, wherein the conductor includes one or more slits that extend from an outer edge of the conductor toward inside of the conductor.

2. The sensor substrate according to claim 1, wherein the fixed potential is a ground potential.

3. The sensor substrate according to claim 1, wherein the sensor substrate is a flexible substrate.

4. A position detecting device comprising:
a housing;
a sensor substrate configured to allow detection of a pointed position based on a capacitance system disposed in the housing; and
a magnetic flux detection substrate configured to allow detection of a position pointed to by a position indicator based on an electromagnetic induction system, the magnetic flux detection substrate being disposed in the housing to face the sensor substrate in the housing;
wherein, the sensor substrate includes a detection area, in which a plurality of detection electrodes are arranged, a wiring area, in which wiring led out from the detection electrodes is arranged, and a conductor connected to a fixed potential and is arranged on one side of the sensor substrate, the conductor being configured and arranged to oppose the wiring area arranged on another side of the sensor substrate,
wherein the conductor includes one or more slits that extend from an outer edge of the conductor toward inside of the conductor and one or more of the plurality of detection electrodes each includes one or more slits that extend from an outer edge of the detection electrode toward inside of the detection electrode.

5. The position detecting device according to claim 4, wherein the magnetic flux detection substrate is so disposed to face the sensor substrate in the housing that an entire surface of the sensor substrate functions as an effective area for the position indicator.

* * * * *